(12) United States Patent
Merchant (10) Patent No.: US 6,634,554 B1
(45) Date of Patent: Oct. 21, 2003

(54) SYSTEM AND METHOD EMPLOYING A PIEZOELECTRIC REFLECTOR FOR OPTIMIZING THE FOCUS OF A DATAFORM READER

(75) Inventor: Peter Merchant, Dorset (GB)

(73) Assignee: Telxon Corporation, Holtsville, NY (US)

( * ) Notice: Subject to any disclaimer, the term of this patent is extended or adjusted under 35 U.S.C. 154(b) by 0 days.

(21) Appl. No.: 09/511,024

(22) Filed: Feb. 23, 2000

(51) Int. Cl.$^7$ ................................................. G06K 7/10
(52) U.S. Cl. .............................. 235/462.23; 235/462.22
(58) Field of Search ..................... 235/462.01–462.49, 235/472.01–472.03

(56) References Cited

U.S. PATENT DOCUMENTS

| | | | | |
|---|---|---|---|---|
| 4,818,886 A | * | 4/1989 | Drucker ....................... | 250/566 |
| 5,319,181 A | * | 6/1994 | Shellhammer et al. . | 235/462.09 |
| 5,554,841 A | * | 9/1996 | Kost et al. .................. | 235/494 |
| 5,576,529 A |   | 11/1996 | Koenck et al. ......... | 235/462.47 |
| 6,049,406 A | * | 4/2000 | Zocca ........................ | 359/196 |
| 6,053,409 A | * | 4/2000 | Brobst et al. .......... | 235/462.36 |
| 6,234,396 B1 | * | 5/2001 | Tawara ................... | 235/472.01 |
| 6,290,134 B1 | * | 9/2001 | Rando et al. .......... | 235/472.01 |
| 6,321,988 B1 | * | 11/2001 | Merchant et al. ...... | 235/462.12 |

FOREIGN PATENT DOCUMENTS

JP            05314297 A   *  11/1993

* cited by examiner

*Primary Examiner*—Michael G. Lee
*Assistant Examiner*—Jamara A Franklin
(74) *Attorney, Agent, or Firm*—Amin & Turocy, LLP (57) ABSTRACT

A dataform reader module is provided utilizing a piezoelectric reflector with a reflecting angle that is adjustable to provide for an optimal focus of an image projected onto a photosensor array. A distance measurement device can provide a distance measurement utilized in adjusting the piezoelectric reflector, such that an optimal focus can be made without the use of multiple lenses and/or reflectors. Alternatively, various dataform readings can be performed to find the optimal focus without employing a distance measurement device. Additionally, distance measurements and readings can be performed on segments of the dataform and the dataform reconstructed after all of the readings have been performed.

37 Claims, 10 Drawing Sheets

SYSTEM AND METHOD EMPLOYING A PIEZOELECTRIC REFLECTOR FOR OPTIMIZING THE FOCUS OF A DATAFORM READER

FIELD OF THE INVENTION

The present invention relates to a portable data collection device including an imaging based dataform reader and, more particularly, to a portable data collection device including an imaging based dataform reader utilizing a piezoelectric reflector for optimizing the focal length of the dataform reader.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, for inventory control, tracking, production control and expediting, quality assurance and other purposes.

Bar code dataforms come in a variety of different formats including one and two dimensional bar codes, matrix codes and graphic codes, as well as words and numbers and other symbols, which may be printed or etched on paper, plastic cards and metallic and other items. For example, a one dimensional bar code dataform typically consists of a series of parallel light and dark rectangular areas of varying widths. The light areas are often referred to as "spaces" and the dark areas as "bars". Different widths of bars and spaces define different characters in a particular bar code dataform.

Data originally encoded in a dataform is recovered for further use in a variety of ways. For example, a printed bar code may be illuminated to derive reflectance values which are digitized, stored in buffer memory and subsequently decoded to recover the data encoded in the bar code. The printed bar code may be illuminated using a laser, an array of LEDs, ambient light, or the like. The light reflected from the printed bar code typically is captured using a photosensor such as, for example, a CCD detector or CMOS detector.

A problem associated with conventional dataform readers is that the readers are designed to read dataforms located within a limited range therefrom. For example, a dataform reader may be designed to read dataforms located within the range of three inches to twelve inches from the reader. The maximum distance at which a dataform reader is able to read a dataform is limited by a resolution of the photodetector used to capture the dataform. For example, using a conventional 640 horizontal pixel photosensor, one dimensional bar code dataforms can be read so long as the distance the reader is placed from the dataform is such that the 640 horizontal pixels are suitable to distinguish among the narrowest bars and spaces forming the dataform. As the dataform reader is moved further away from a dataform, the images of the bars and spaces appear smaller at the photosensor thereby limiting the range at which the dataform reader is able to read a dataform.

One way to allow the dataform reader to read the dataform at longer distances or at different focal lengths is to increase the resolution of the photosensor. For example, rather than providing 640 horizontal pixels, the photosensor may include 1000 or more horizontal pixels. In this manner, the photosensor is able to distinguish among smaller features of the dataform thereby enabling reading of dataforms located farther away. A significant drawback to increasing the number of horizontal pixels on the photosensor is that a width of the photosensor becomes proportionately larger in order to accommodate the additional pixels. As the width of the photosensor increases, so does the overall width of the reader module. Unfortunately, due to customer demand for smaller and more compact dataform readers, the ability to increase the width of the reader module is often not a feasible option.

A method employed to provide different focal lengths for the same dataform reader is to utilize several mirrors and lenses at varying distances within the dataform reader for focusing the image on different photosensor arrays. This complicates the construction of the device and increases the cost since lens assemblies for these particular devices are quite expensive. In addition, the logic circuitry within the dataform reader must choose between the best focus amongst the different photosensor arrays, which is not necessarily the optimal focus. Many times, motors and other electromechanical devices are employed to move the mirrors and/or lenses. Unfortunately, mechanical components such as motors and moving mirrors tend to wear over time which may ultimately produce mechanical failures in the scanners.

Other techniques have evolved which employ electronic systems to choose an optimal focal length for a particular reading. While solving some of the aforementioned problems with moving mechanical components, many of these electronic systems are fabricated by employing elaborate processes and materials. Also, many conventional electronic systems employ complicated geometrical shapes and structures to achieve desired scanning results.

Accordingly, there is a strong need in the art for a dataform reader which is capable of reading dataforms at varying distances which overcomes the aforementioned drawbacks.

SUMMARY OF THE INVENTION

The present invention provides for a dataform reader utilizing a piezoelectric reflector with a reflection angle that is adjustable to provide for an optimal focus of an image projected onto a photosensor array. A distance measurement device can provide a distance measurement utilized in adjusting the piezoelectric reflector, such that an optimal focus can be made without the use of multiple lenses and/or reflectors. Alternatively, various dataform readings can be performed to find the optimal focus without employing a distance measurement device. Additionally, distance measurements and readings can be performed on segments of the dataform and the dataform reconstructed after all of the readings have been performed. This provides for maximizing the pixel data captured by the photosensor array, while also enabling the dataform reader to perform readings on dataforms that do not lie within a single plane, for example, round dataforms. Furthermore, the dataform reader can perform readings when the dataform reader is inclined relative to the dataform.

According to one aspect of the invention, a dataform reading module is provided. The dataform reading module includes a photosensor, a lens for focusing a respective image representing a dataform taken along a target line onto the photosensor and a piezoelectric reflector configured to direct an image of the dataform taken along the target line onto the lens. The piezoelectric reflected is adjustable based on an optimal focus measurement. The dataform reading module also includes an illuminating device for illuminating the dataform.

According to another aspect of the invention, a dataform reader for reading a dataform is provided. The dataform reader includes a hand-portable sized housing having at least one lens and a reading module included within the housing. The reading module includes a photosensor array and a piezoelectric reflector for directing a respective image representing the dataform along a target line onto the at least one lens. The piezoelectric reflector is adjustable based on an optimal focus measurement. The at least one lens and the piezoelectric reflector are configured to focus an image of the dataform along the target line onto the photosensor array. The dataform reader also includes an illuminating device for illuminating the dataform.

According to yet another aspect of the invention, a method for reading a dataform employing a dataform reading module is provided. The method includes the steps of making an optimal focus measurement based on a focal length of the dataform reading module from the dataform, adjusting an angle of reflection of a piezoelectric reflector based on the optimal focus measurement, focusing an image of the dataform taken along a target line reflected from the piezoelectric reflector through a lens assembly onto a photosensor array and reconstructing a final image of the dataform taken along the target line.

According to still yet another aspect of the invention, a dataform reading module is provided. The dataform reading module including means for reflecting a dataform to a means for capturing images of a dataform, means for adjusting the reflection angle of the means for reflecting a dataform to provide an adjustable focus length of the dataform reading module, the means for adjusting the reflection angle being based on an optimal focus measurement and means for reconstructing the image of the dataform.

These and other aspects, features and advantages of the invention will become better understood from the detailed description of the preferred embodiments of the invention which are described in conjunction with the accompanying drawings.

Detailed Description of the Invention

The present invention will now be described with reference to the drawings wherein like reference numerals are used to refer to like elements throughout. The present invention provides for a dataform reader utilizing a piezoelectric reflector(s) that are adjustable to provide for an optimal focus of an image projected onto a photosensor array. It should be understood that the description of these preferred embodiments are merely illustrative and that they should not be taken in a limiting sense.

Figure 1:
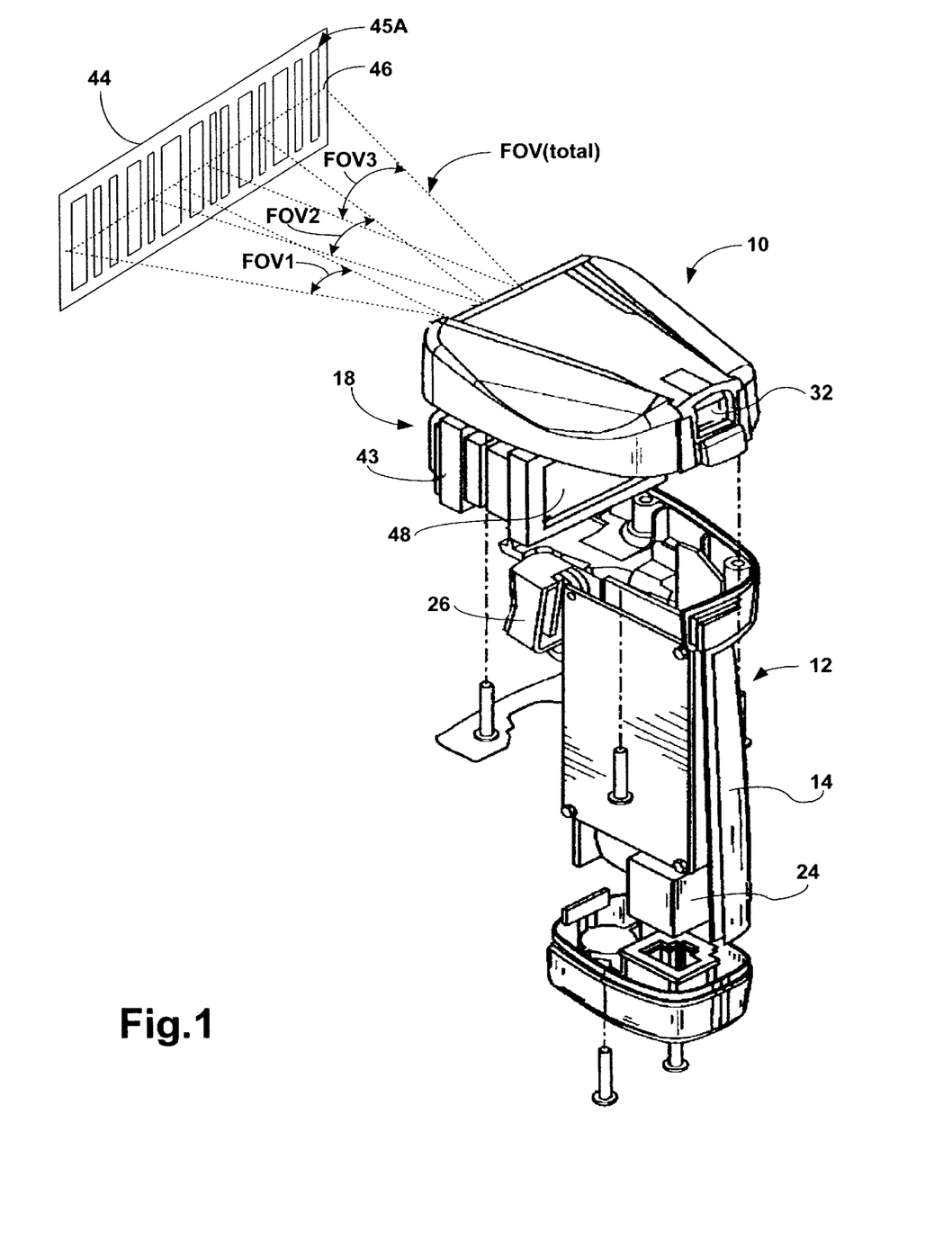
FIG 1 is a partial exploded view of a portable data collection device in accordance with one aspect of the present invention.

Turning to FIG. 1, a portable, hand held data collection device in accordance with the present invention is shown generally at 10. The portable data collection device 10 includes a photosensor array imaging assembly 18 which is capable of imaging a target dataform 45a located within an imaging target area 44 of the imaging assembly 18. As will be described more fully below, the imaging assembly 18 includes at least one piezoelectric reflector system and a single lens assembly wherein the at least one piezoelectric reflector provides to the lens a focused image based on a distance measurement made by a distance measurement device. Additionally, the dataform reader 45a can be programmed to capture partially overlapping fields of view FOV1 through FOV9 by varying the focus of the piezoelectric reflector while reading segments of the target dataform. In this situation, the at least one piezoelectric reflector is continuously adjusted to direct an image received from the field of views along a target line 46 to a photosensor array 48. An image processing circuit coupled to the photosensor array 48 receives pixel data from each reading of the photosensor array 48 and reconstructs the image directed by the collection of segments along the target line 46. In particular, the image processing circuit correlates the image data received from the segment readings in order to discard overlapping data and stream together the data across the entire field of view $FOV_{total}$ for the collection of segment readings. Since each segment reading is directed through a single lens onto the photosensor array 48, the apparent resolution of the photosensor array 48 in reading data along the target line 46 is increased since more pixels are available for capturing each segment along each FOV. This, in turn, enables the portable data collection device 10 to read dataforms at longer ranges without increasing a width of the photosensor array imaging assembly 18.

The data collection device 10 includes a housing 12 defining an interior region for containing various mechanical and electrical components as described herein. The housing 12 includes a gripping portion 14 sized to be grasped in the hand of an operator. Coupled to the housing 12 is a dataform reading switch or actuator 26. The dataform reading trigger 26 is positioned to be depressed by an index finger of the operator while the gripping portion 14 of the housing 12 is held in the operator's hand. Also supported within the housing 12 is a power source 24 such as a rechargeable battery for supplying operating power to the portable data collection device 10.

The housing 12 also includes a small opening through which a portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform. The color red is displayed when the device 10 is not ready to perform an operation.

Figure 3:
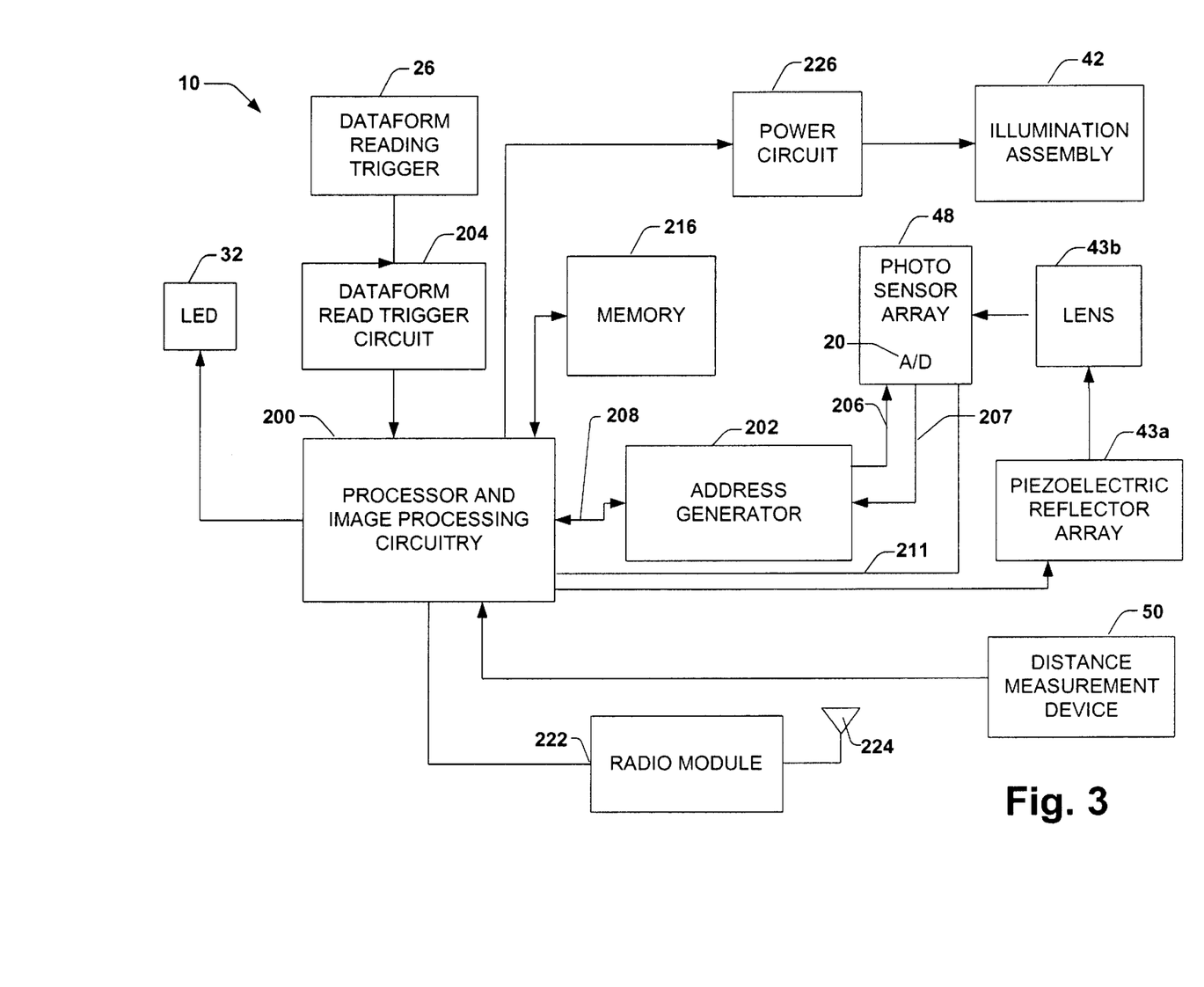
FIG. 3 is a block diagram of the components of the portable data collection device in accordance with one aspect of the present invention.

The imaging assembly 18 is disposed within a top portion of the housing 12 and includes the lens (not shown), piezoelectric reflector assembly 43, photosensor array 48 and illumination assembly 42 (FIG. 3). In the present embodiment of the invention, the illumination assembly 42 is a laser assembly, however, it will be appreciated that various other illumination sources such as an array of LEDs could alternatively be used.

Figure 2A:
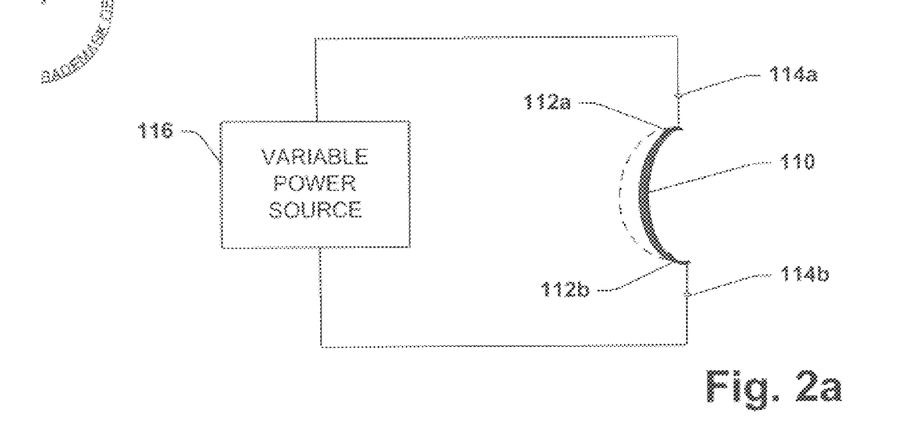
FIG. 2a is schematic diagram of a piezoelectric reflector coupled to an adjustable DC power source in accordance with one aspect of the invention.

FIG. 2a illustrates the operation of a piezoelectric reflector 110 in accordance with the present invention. The piezoelectric material 110 is mounted in the form of a radially defined arc at non-movable fixed locations 112a and 112b. Affixed to the piezoelectric material 110 are electrodes 114a and 114b which are connected to a variable power source 116. When voltage is applied by the variable power source to the piezoelectric material 110, the radially defined arc of the piezoelectric material 110 is caused to expand and/or contract in a radially defined direction as depicted by the dotted line in FIG. 2a. The variable DC source 116 allows for the voltage applied to the piezoelectric reflector to be varied resulting in the adjustment of the reflection angle of the piezoelectric reflector 110. This allows for adjustment of the focus of the dataform reader 10 by the piezoelectric reflector 110. The dataform reader 10 can utilizes these piezoelectric reflector adjustments to capture additional samples of the same indicia for redundant checking of the indicia. In addition, several adjustments to the piezoelectric reflector can be made to capture segments of the dataform, so that the number of pixels for each reading can be maximized. Furthermore, use of an adjustable piezoelectric reflector allows for reading dataforms that have segments at varying distances, such as round dataforms. As will be described in more detail below, the radially-arced surface 110 is polished to provide a reflecting radial surface to direct an image toward a photosensor array.

Figure 2B:
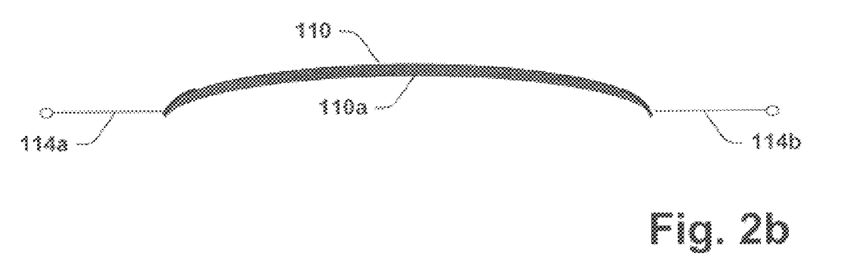
FIG. 2b is a top view of a piezoelectric reflector in accordance with one aspect of the invention.

Now referring to FIG. 2b, a detailed drawing of the radially-arced piezoelectric material 110 is shown. The piezoelectric material 110 has a polished surface 110a for reflecting an image to area on a photosensor array. Polishing may be achieved by applying well known chemical or mechanical processes on the surface 110a. It is also to be appreciated that a metallic layer (e.g., metallic foil) could be attached to the surface of the piezoelectric material to provide a reflecting surface. As shown, electrodes 114a and 114b are attached to a first and second end of a single layer of piezoelectric material 110. When voltage is applied to the ends of the material as shown in FIG. 2a, the curvature of the formed arc changes because of an elongation in the crystalline structure of the piezoelectric material 110. A plurality of various piezoelectric materials may be employed as long as the crystalline structure of the material is conformable to an arc and is suitable for polishing. By forming an arc to provide a reflection angle, the present invention provides several advantages over conventional systems. For example, the arc provides a variable reflection angle from a single layered piezoelectric material. A small movement in the arc allows for a wide reflection pattern on the photosensor array. This provides a wide-angle reflection system formed from a single layer of low cost piezoelectric material. Many conventional systems, employ multiple layers of material or rely on complicated structures in order to produce the necessary reflection angles. Another advantage of the radially formed arc is that manufacturing costs may be reduced since the low cost piezoelectric material is readily mounted to a printed circuit board at two fixed locations 112a and 112b.

Figure 2C:
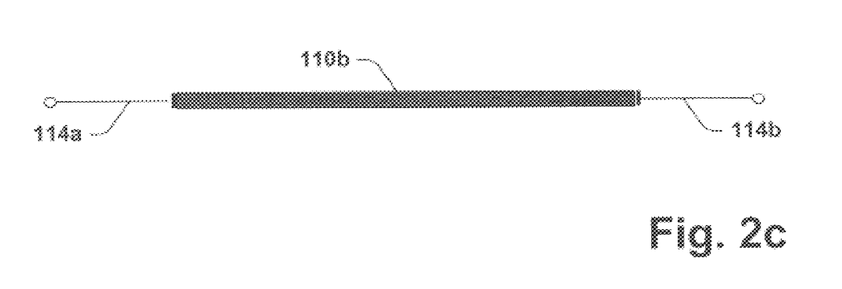
FIG. 2c is a top view of an alternate piezoelectric reflector in accordance with one aspect of the invention.

Turning now to FIG. 2c, another embodiment of the present invention is illustrated. In this embodiment, the piezoelectric material 110b is formed as a straitened single layer with electrodes 114a and 114b attached at opposing ends as shown in FIG. 2b. A metallic reflective foil is radially formed and attached to both ends of the piezoelectric material 110b. As a DC voltage 116 is applied, the piezoelectric material lengthens and contracts in a straight line causing a radially formed arc in the metallic foil to radially deflect inward or outward. As described above, when the radially formed metallic arc moves, a variable reflection angle is provided to direct an image to a photosensor array.

Figure 2D:
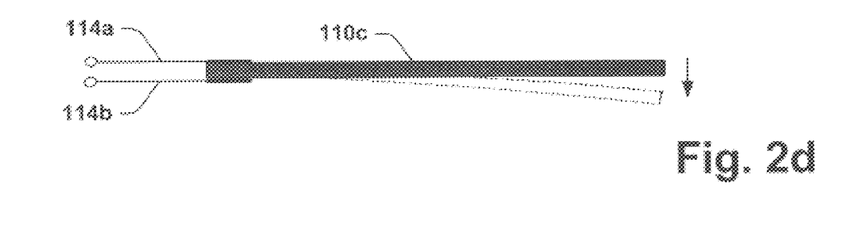
FIG. 2d is a top view of yet another alternate piezoelectric reflector in accordance with one aspect of the invention.

It is to be appreciated that many embodiments for deploying a radially-arced deflection system are possible. For example, referring to FIG. 2d, another embodiment of the present invention is illustrated. A piezoelectric material 110c is shown in FIG. 2d, with electrodes 114a and 114b at the same end of the material. When a voltage is applied to the piezoelectric material 110c, a bend may occur in the direction of the arrow toward the dotted line as shown, for example. Bends may occur in the opposite direction if an opposite polarity voltage is applied.

Turning now to FIG. 3, a block diagram of the data collection device 10 is provided. A microprocessor 200 controls the various operations and performs image analysis in decoding a target dataform as is described more fully below. The microprocessor 200 is programmed to carry out the various control and processing functions utilizing conventional programming techniques. A memory 216 coupled to the microprocessor 200 serves to store the various programs and other data associated with the operation of the data collection device 10 as described herein. A person having ordinary skill in the art will be able to program such operations without undue effort. Hence, additional detail is omitted for sake of brevity.

The microprocessor 200 is coupled to an address generator 202, via a local bus 208, which is designed to output a sequence of pixel addresses corresponding to a desired pixel data readout pattern from photosensor array 48. For example, as discussed in more detail below, the microprocessor 200 may be configured to read out consecutive horizontal lines of pixel data from multiple zones so that such pixel data can be processed to reconstruct the entire dataform provided within the field of view $FOV_{total}$ of the data collection device 10. The addresses are provided from the address generator 202 to the photosensor array 48 via an address bus 206. The photosensor array 48 provides, as its output data, pixel data on data bus 207 which corresponds to the address provided on bus 206. The address generator 202 in turn provides the pixel data to the microprocessor 200 via bus 208. Data may therefore be collected from the photosensor array 48 substantially in real time according to a predefined data readout pattern. It will be appreciated that while the present embodiment depicts the address generator 202 to be physically separated from the photosensor array 48, it is possible for both components to be provided on a single chip.

In order to carry out a dataform reading operation, the operator points a piezoelectric reflector system 43a towards the target dataform. Light is directed by the piezoelectric reflector system 43a to a lens 43b which cooperate with one another to focus the light on the photosensor array 48. The operator then initiates the dataform read operation via the trigger 26 or other methods. The dataform read trigger circuit 204 generates an interrupt signal which is provided to the microprocessor 200 indicating the initiation of a dataform reading operation. The microprocessor 200 communicates with the address generator 202 via the control bus 205 which causes the address generator 202 to begin generating addresses for the predefined readout pixel pattern.

The image data from the photosensor array 48 consists of digital data indicative of the instantaneous illumination of the pixel. In the exemplary embodiment, it is assumed that the target dataform 45b is made up of a series of black and white bars/spaces. The photosensor array 48 includes an analog to digital (A/D) converter 210 therein for converting analog pixel data obtained from the addressed pixels to digital pixel data. The A/D converter 210 has adjustable gain which may be adjusted via a gain adjust control signal provided on line 211 from the microprocessor 200. The digitized pixel data from the photosensor array 48 is provided via the address generator 202 to the microprocessor 200. The microprocessor 200 evaluates the range of the acquired pixel data on-the-fly to see if the full range of the A/D converter 210 is utilized. If not, the microprocessor 200 adjusts the gain of the input to the A/D converter 210. The microprocessor 200 then receives a distance measurement from a distance measurement device 50 according to the distance that the target dataform 45b is from the dataform reader 10. The microprocessor 200 then transmits an adjustment signal to the piezoelectric reflector system 43a, so that the appropriate focal length is provided. The microprocessor 200 then proceeds to decode the image of the target dataform.

The data collection device 10 further includes a radio module 222 and antenna 224 for wirelessly transmitting and receiving data with remote devices. Additionally and/or alternatively, the data collection device 10 may include a serial or parallel I/O port (not shown) for communicating data with external devices.

The microprocessor 200 is coupled to the illumination assembly 42 via power circuitry 226 which enables the microprocessor 200 to control the illumination assembly 42 to provide general illumination and targeting during operation. As mentioned above, the illumination assembly 42 of the present embodiment may employ any of various light sources wherein output light is sculpted to be spread across a dataform. The microprocessor 200 is coupled to the LED 32 to adjust color state so as to exhibit current mode of operation.

Figure 4A:
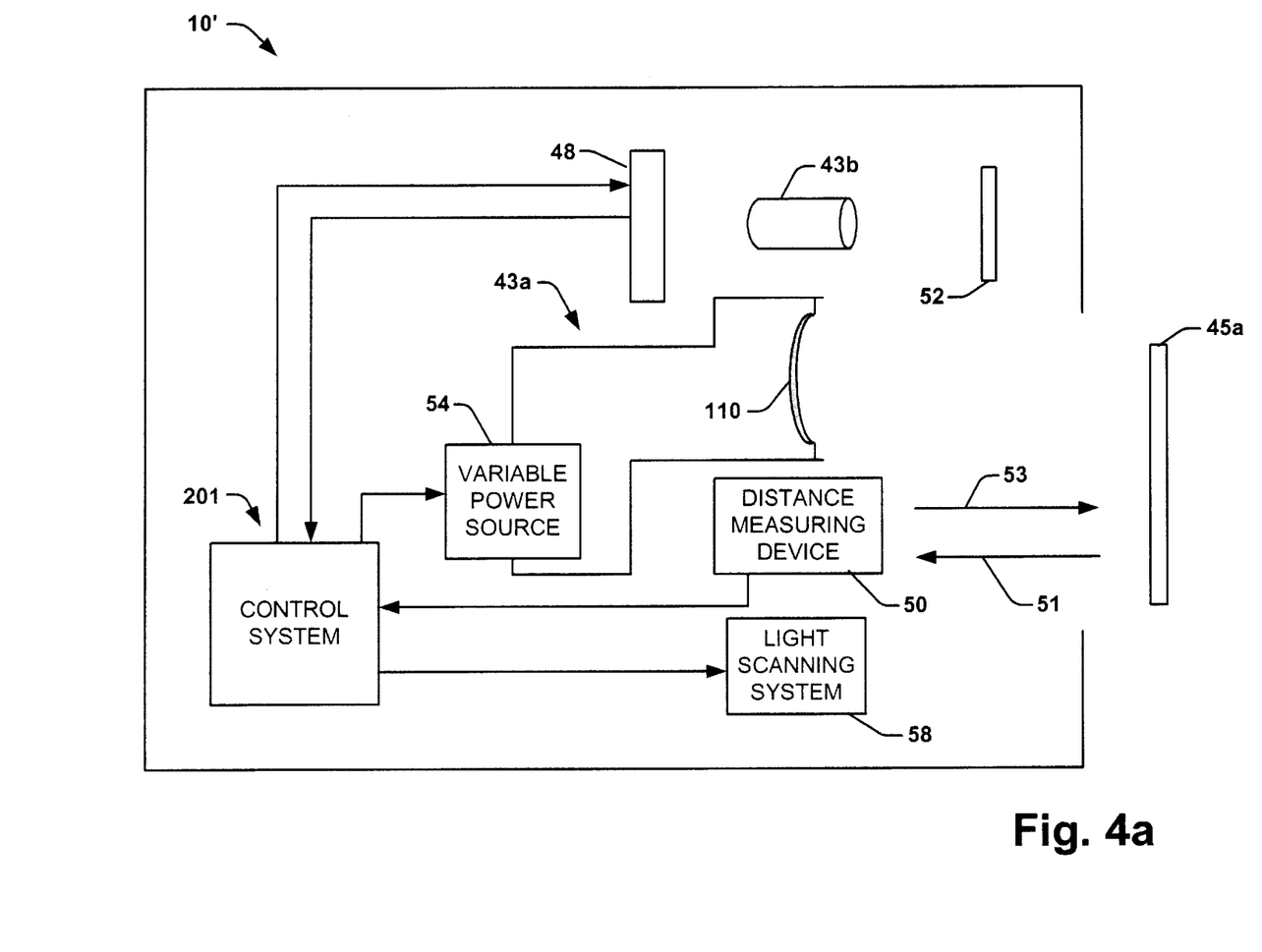
FIG. 4a is a block diagram of the components of the portable data collection device during a distance measurement in accordance with one aspect of the present invention.

Turning now to FIG. 4a wherein like parts are denoted by like reference numerals, the piezoelectric reflector system 43a will be explained in more detail. A dataform reader 10' includes a control system 201, which may include the microprocessor 200, the memory 216, the address generator 202 and various other components as illustrated in FIG. 3. A light scanning system 58 is also provided that may include the power circuit 226 and the illumination assembly 42 also illustrated in FIG. 3. The dataform reader 10' further includes the photosensor array 48, the distance measuring device 50 and the lens assembly 43b. The piezoelectric reflector system 43a includes a variable DC source 54, the piezoelectric reflector 110 and a fixed reflection mirror 52. As illustrated in FIG. 4a, a signal 53 is generated by the distance measuring device 50 to the target dataform 45a and a response signal 51 is received by the distance measuring device corresponding to the distance that the dataform target 45a is from the dataform reader 10'. The distance measuring device can utilize an ultrasonic transducer for measuring distance or alternatively utilize infrared distance measurement means. It is to be appreciated that any mechanism or method for providing distance measurements to the dataform reader can be employed to carry out the invention described herein. The distance measurement device 50 provides the control system 201 with the distance measurement data. The control system 201 uses this information to control the variable power source and thus the reflection angle of the piezoelectric reflector 110 based on the optimal focal point for the piezoelectric reflector 110.

Figure 4B:
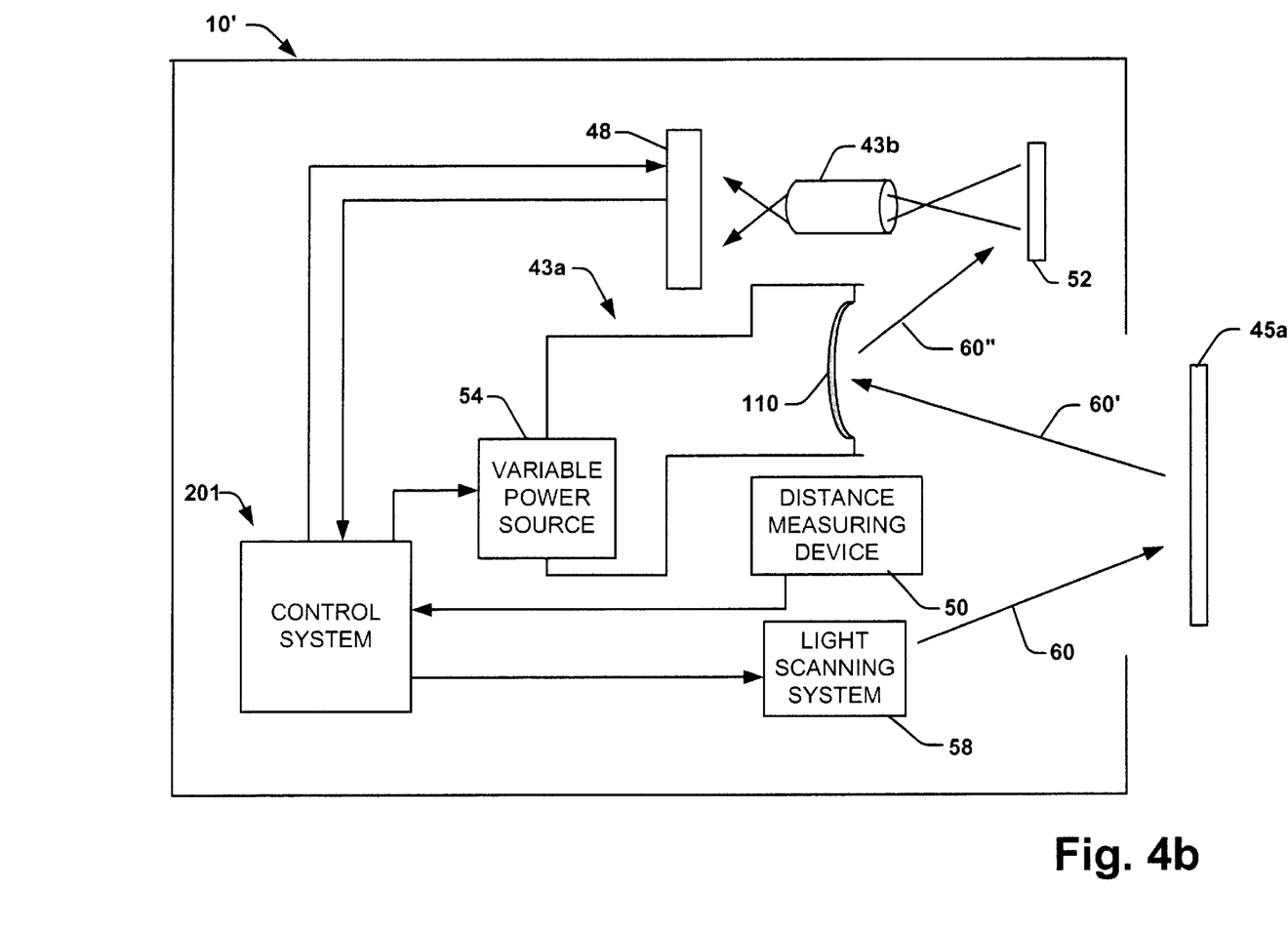
FIG. 4b is a block diagram of the components of the portable data collection device during a dataform reading in accordance with one aspect of the present invention.

After the adjustment to the piezoelectric reflector is accomplished, the dataform 45a can be read by the dataform reader 10'. As illustrated in FIG. 4b, the light scanning system 58 provides a light ray 60 that scans along the dataform 45a, which return a light reflection 60' of the dataform image to the piezoelectric reflector 110. The piezoelectric reflector 110 reflects a second light reflection of this image 60" to a fixed mirror, which focus the final image through the lens assembly 43b to the photosensor array 48. It is to be appreciated that the photosensor array 48 can capture segments of the dataform 45a as the light scanning system 58 scans the dataform 45a and store these segments for later reconstruction, so as to maximize the number of pixels read for each dataform. In addition, the distance measurement device 50 can be adapted to capture different distance measurements for different segments, such that the piezoelectric reflector can be focused for each segment of a non-planar dataform, or adapted to focus the dataform even when the dataform reader 10' is held at an angle during reading.

Figure 4C:
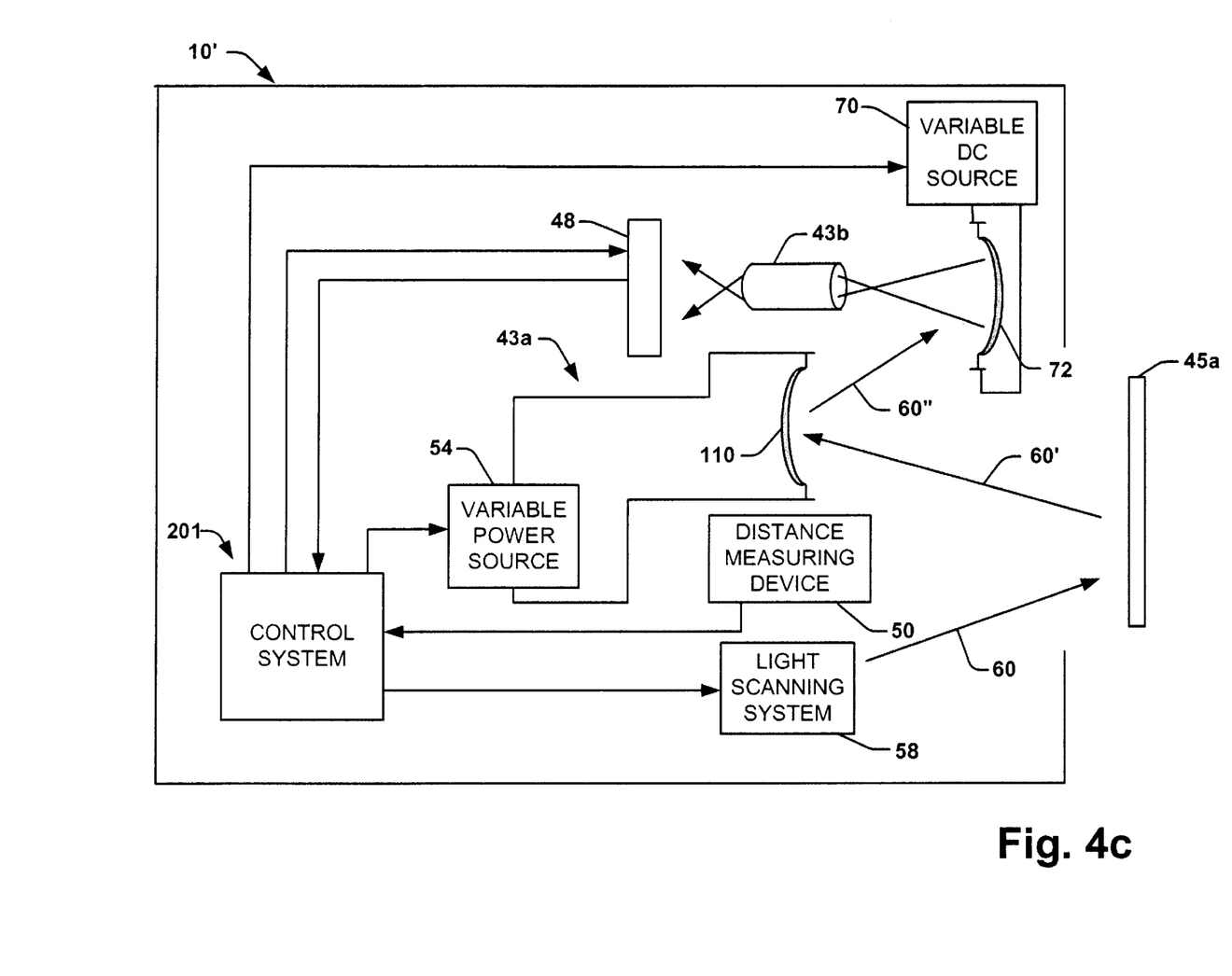
FIG. 4c is a block diagram of the components of an alternate embodiment of the portable data collection device during a dataform reading in accordance with one aspect of the present invention.
Figure 4D:
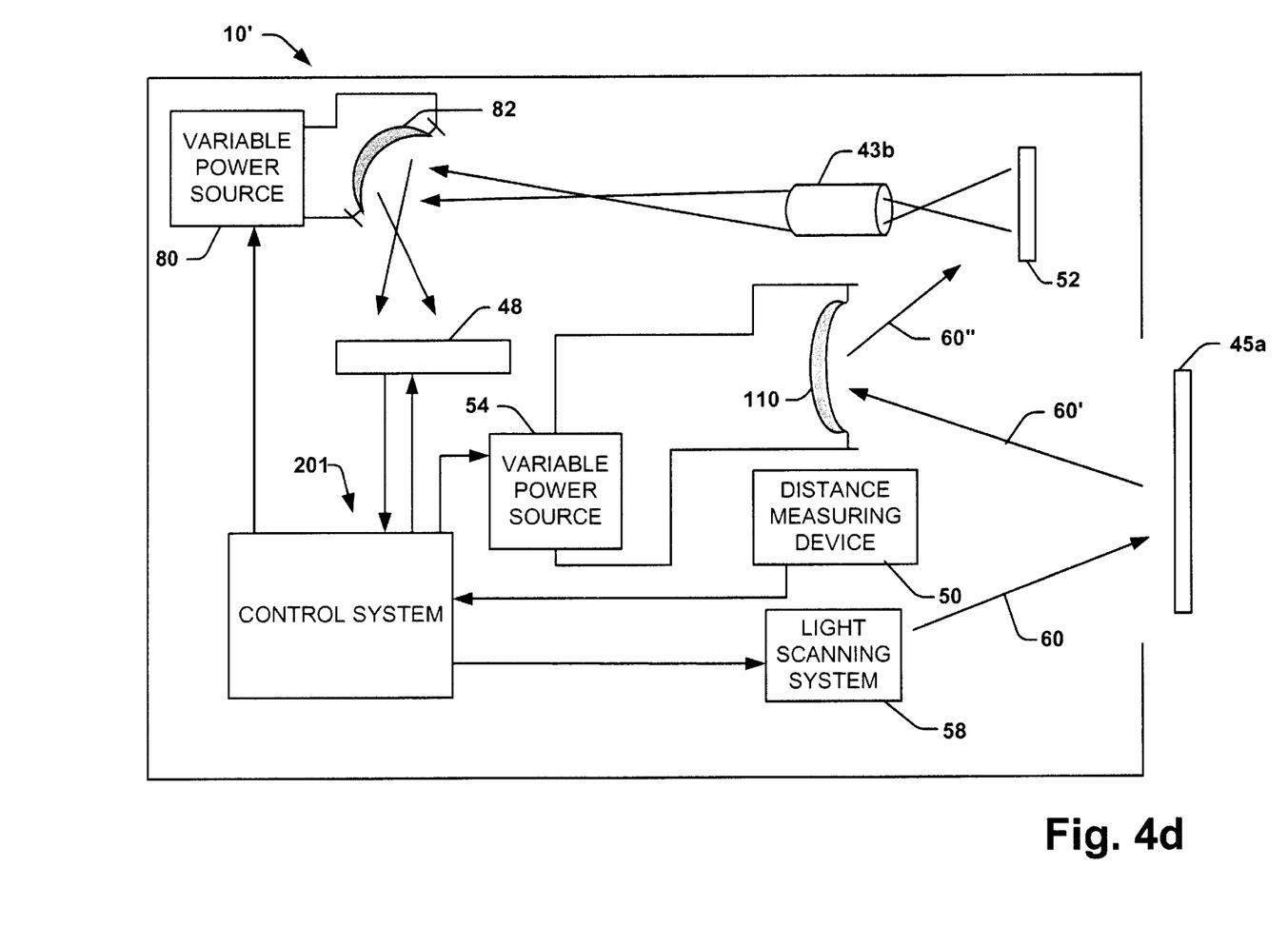
FIG. 4d is a block diagram of the components of yet another alternate embodiment of the portable data collection device during a dataform reading in accordance with one aspect of the present invention.

FIG. 4c illustrates an alternate embodiment wherein the fixed mirror 52 of FIGS. 4a and 4b is replaced with a second piezoelectric reflector 72 controlled by a second variable power source 70. In this embodiment, the control system utilizes the measured distance data to control the reflection angle of both the piezoelectric reflector 110 and the second piezoelectric reflector 72 by controlling the respective variable power sources, 54 and 70. Both reflectors can be adjusted at the same respective rate or at different rates from one another. FIG. 4d illustrates yet another embodiment where a post lens piezoelectric reflector 80 is placed after the lens assembly 43b of the dataform reader 10' illustrated in FIGS. 4a and 4b, such that the image is focused onto the piezoelectric reflector 82 to the photosensor array 48. In this embodiment, the focus of the dataform image is further optimized by adjustment of a post lens variable DC source 80, coupled to the post lens piezoelectric reflector 82, controlled by the control system 201.

Figure 5:
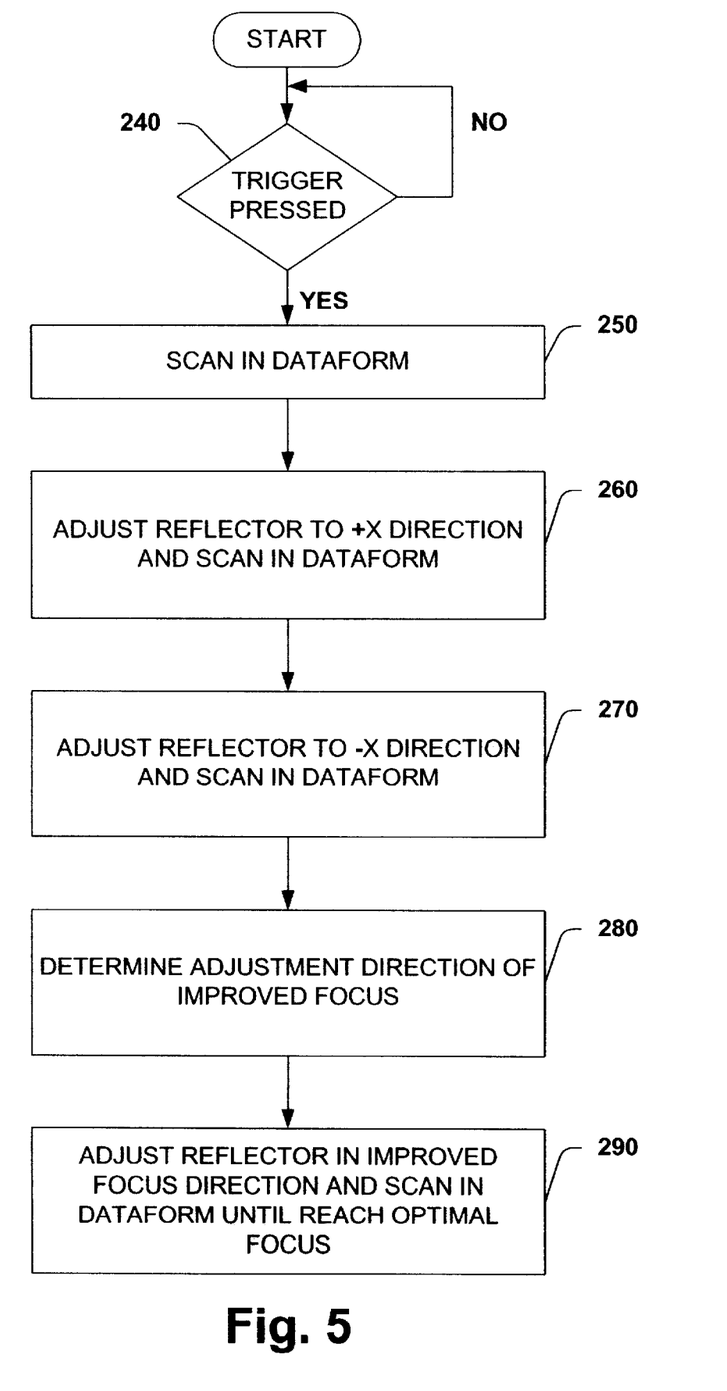
FIG. 5 is a flowchart representing the operation of the portable data collection device without a distance measurement device in accordance with one aspect of the present invention.

Alternate methods of finding the optimal focus may be employed without using the distance measurement device 50. Turning now to FIG. 5, illustrating a flow chart depicting the operations of the microprocessor 200 in reading a dataform 45a without the distance measurement device 50. In particular, beginning at step 240, the microprocessor 200 initially determines whether the trigger 26 has been activated. If the trigger 26 has not been activated, the processor 200 returns to step 240. If, on the other hand, the trigger 26 has been activated, the processor 200 proceeds to step 250. In step 250, the processor 200 captures the dataform image in accordance with the techniques discussed above. In particular, using a laser illumination assembly 42 and the piezoelectric reflector assembly 43a, the dataform 45a is captured onto the photosensor array 48. In step 260, the processor 200 adjusts the reflector angle of the piezoelectric reflector 110 to the +X direction and scans the dataform in for a second reading. In step 270, the processor 200 adjusts the reflector angle to the −X direction and scans the dataform in for a third reading. In step 280, the processor 200 determines the adjustment direction for the improved focus. Next, in step 290, the processor 200 continues adjusting the reflector in the improved focus direction and scanning the dataform until reaching the optimal focus.

Figure 6:
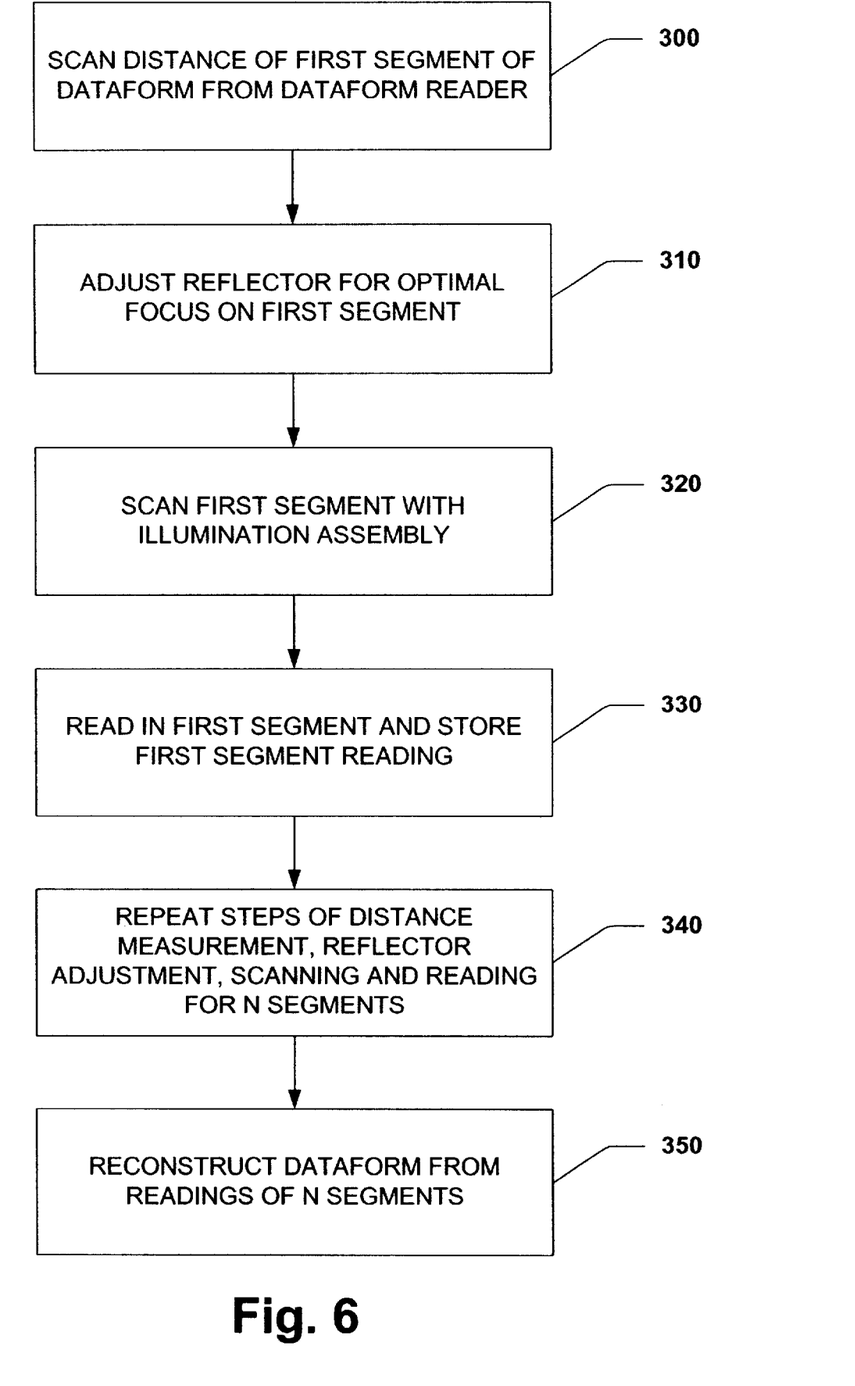
FIG. 6 is a flowchart representing the operation of the portable data collection device during a multiple segment reading in accordance with one aspect of the present invention.
Figure 7:
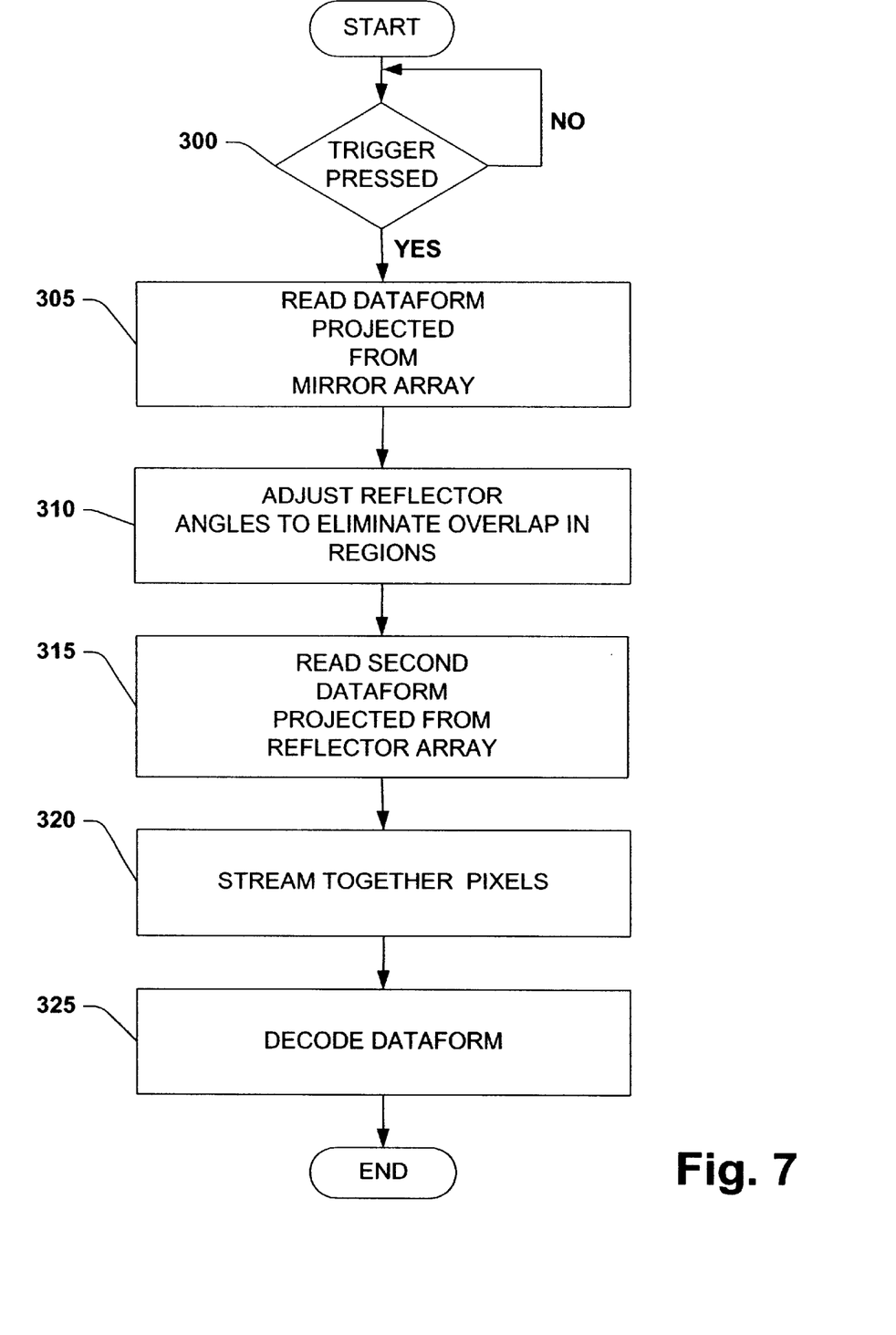
FIG. 7 is a flowchart illustrating the operations of the microprocessor in reading a dataform in segments for maximum resolution.

Turning now to FIG. 6, illustrating a flow chart depicting the operations of the microprocessor 200 in reading a dataform 45a in segments for maximum resolution. In step 300, the microprocessor 200 scans the distance of the first segment of the dataform using the distance measurement device. In step 310, the processor adjusts the piezoelectric reflector 110 for optimal focus based on the distance measurement of the first segment. In step 320, using the laser illumination assembly 42 and the piezoelectric reflector assembly 43a, a segment of the dataform 45a is captured onto the photosensor array 48 and stored in the memory 216 for later processing in step 330. In step 340, the processor 200 repeats the steps of measuring the distance of the segment with the distance measuring device 50, adjusting the piezoelectric reflector 110, scanning the segment with the illumination assembly, capturing the segment with the photosensor array 48 and storing the segment in the memory 216 for N different segments. In step 350, the processor 200 reconstructs the dataform from the readings of the N different segments stored in the memory 216.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A dataform reading module, comprising:
   a photosensor;
   a lens for focusing a respective image representing a dataform taken along a target line onto the photosensor;
   a single layer piezoelectric reflector configured to direct an image of the dataform taken along the target line onto the lens, the piezoelectric reflector being adjustable based on an optimal focus measurement; and
   an illuminating device for illuminating the dataform.

2. The dataform reading module of claim 1, wherein the optimal focus measurement is based on a distance measurement by a distance measurement device.

3. The dataform reading module of claim 2, wherein the distance measurement device is an ultrasonic transducer device.

4. The dataform reading module of claim 2, wherein the distance measurement device is an infrared detection device.

5. The dataform reading module of claim 1, wherein the optimal focus measurement is based on continuous readings of the dataform by the dataform reader while continuously adjusting the piezoelectric reflector until the optimal focus measurement is achieved.

6. The dataform reading module of claim 1, further including imaging processing circuitry configured to receive pixel data from the photosensor.

7. The dataform reading module of claim 6, wherein the imaging processing circuitry is configured to adjust a reflecting angle of the piezoelectric reflector for varying the focal length of the dataform reader.

8. The dataform reading module of claim 6, wherein the imaging processing circuitry is configured to read segments of the dataform and adjust a reflecting angle of the piezoelectric reflector for varying the focal length of the dataform reader for each segment based on an optimal focus reading of each segment.

9. The dataform reading module of claim 8, wherein the imaging processing circuitry is further configured to store each segment read by the dataform reader and reconstruct an image of the dataform based on each segment read.

10. The dataform reading module of claim 9, wherein the target dataform is a round barcode.

11. The dataform reading module of claim 1, further including a fixed reflecting mirror adapted to reflect the image of the dataform from the piezoelectric reflector onto the lens.

12. The dataform reading module of claim 1, further including a second adjustable piezoelectric reflector configured to reflect the image of the dataform from the piezoelectric reflector onto the lens.

13. The dataform reading module of claim 1, further including a post lens adjustable piezoelectric reflector configured to reflect the image of the dataform from the lens onto the photo sensor.

14. The dataform reading module of claim 1, wherein the illumination device is a laser.

15. The dataform reading module of claim 1, wherein the illumination device includes at last one light emitting diode.

16. The dataform reading module of claim 1, wherein the lens is a telephoto lens.

17. The dataform reading module of claim 1, wherein the piezoelectric reflector is formed on a single substrate.

18. A dataform reader for reading a dataform, comprising:
    a hand-portable sized housing having at least one lens;
    a reading module included within the housing, the reading module including:
       a photosensor array;
       a single layer piezoelectric reflector for directing a respective image representing the dataform along a target line onto the at least one lens, the piezoelectric reflector being adjustable based on an optimal focus measurement, the at least one lens and the piezoelectric reflector being configured to focus an image of the dataform along the target line onto the photosensor array; and
       an illuminating device for illuminating the dataform.

19. The dataform reader of claim 18, further comprising an RF transceiver coupled to the reading module for transmitting and receiving wireless data.

20. The dataform reader of claim 18, further comprising a rechargeable battery disposed in the housing for providing power to the dataform reader.

21. The dataform reader of claim 18, further including a second adjustable piezoelectric reflector configured to reflect the image of the dataform from the piezoelectric reflector onto the lens.

22. The dataform reading module of claim 18, further including a post lens adjustable piezoelectric reflector configured to reflect the image of the dataform from the lens onto the photosensor array.

23. The dataform reader of claim 18, further including imaging processing circuitry configured to receive pixel data from the photosensor array and reconstruct an image of the dataform captured along the target line.

24. The dataform reader of claim 23, wherein the imaging processing circuitry is configured to read segments of the dataform and adjust a reflecting angle of the piezoelectric reflector for varying the focal length of the dataform reader for each segment based on an optimal focus measurement of each segment.

25. The dataform reader of claim 24, wherein the imaging processing circuitry is further configured to store each segment read by the dataform reader and reconstruct an image of the dataform based on each segment read.

26. The dataform reader of claim 23, wherein the imaging processing circuitry is configured to adjust a reflecting angle of the piezoelectric reflector for varying the focal length of the dataform reader based on the optical focus measurement being a distance measurement provided by a distance measurement device to the image processing circuitry.

27. The dataform reading module of claim 23, wherein the image processing circuitry controls a variable DC power source coupled to the piezoelectric reflector for adjustment of a reflecting angle of the piezoelectric reflector.

28. The dataform reading module of claim 23, wherein the imaging processing circuitry is configured to find the optimal focus measurement based on continuous readings of the dataform by the dataform reader while continuously adjusting the piezoelectric reflector until the optimal focus measurement is achieved.

29. A method for reading a dataform employing a dataform reading module, comprising the steps of:

making an optimal focus measurement based on a focal length of the dataform reading module from the dataform;

adjusting an angle of reflection of a single layer piezoelectric reflector based on the optimal focus measurement;

focusing an image of the dataform taken along a target line reflected from the piezoelectric reflector through a lens assembly onto a photosensor array; and reconstructing a final image of the dataform taken along the target line.

30. The method of claim 29, wherein the step of making an optimal focus measurement based on the focal length is a distance measurement made by a distance measurement device based on the distance of the dataform from the dataform reader.

31. The method of claim 29, wherein the step of making an optimal focus based on the focal length is based on a plurality of readings made by the dataform reader at different reflection angles of the piezoelectric reflector and selecting the reflection angle giving the optimal focus.

32. The method of claim 29, further including the steps of making an optimal focus measurement for N different segments of the dataform, adjusting a reflecting angle of the piezoelectric reflector based on the optimal focus measurements for the N different segments, focusing the image of the dataform taken along each segment reflected from the piezoelectric reflector through a lens assembly onto a photosensor array and storing the segments prior to the step of reconstructing a final image of the dataform taken along the target line.

33. The method of claim 32, wherein the step of reconstructing the final image includes the steps of:

streaming together the plurality of segments stored; and discarding images of duplicate portions of the dataform stored.

34. The method of claim 29, further including the step of illuminating the dataform prior to the step of focusing.

35. The method of claim 34, wherein the step of illuminating is by way of a laser light.

36. The method of claim 29, wherein the step of focusing further includes focusing the image onto a second adjustable piezoelectric reflector configured to reflect the image of the dataform from the piezoelectric reflector onto the lens.

37. The method of claim 29, wherein the step of focusing further includes focusing the image onto a post lens adjustable piezoelectric reflector configured to reflect the image of the dataform from the lens onto the photosensor array.

* * * * *